United States Patent
Shuster

(10) Patent No.: US 8,385,691 B2
(45) Date of Patent: Feb. 26, 2013

(54) METHOD AND APPARATUS FOR PHOTOGRAPH FINDING

(75) Inventor: Gary Stephen Shuster, Fresno, CA (US)

(73) Assignee: Hoshiko LLC, Henderson, NV (US)

( * ) Notice: Subject to any disclaimer, the term of this patent is extended or adjusted under 35 U.S.C. 154(b) by 0 days.

(21) Appl. No.: 13/090,026

(22) Filed: Apr. 19, 2011

(65) Prior Publication Data

US 2011/0249912 A1 Oct. 13, 2011

Related U.S. Application Data

(63) Continuation of application No. 12/874,929, filed on Sep. 2, 2010, now Pat. No. 7,929,810, which is a continuation of application No. 12/325,589, filed on Dec. 1, 2008, now Pat. No. 7,844,141, which is a continuation of application No. 11/056,699, filed on Feb. 10, 2005, now Pat. No. 7,460,737.

(60) Provisional application No. 60/544,570, filed on Feb. 12, 2004.

(51) Int. Cl.
*G06K 9/60* (2006.01)

(52) U.S. Cl. ........ 382/305; 382/115; 382/117; 382/278; 340/5.82

(58) Field of Classification Search .......... 382/115, 382/118, 278, 305, 307; 358/403; 340/5.81, 340/5.82, 5.83

See application file for complete search history.

(56) References Cited

U.S. PATENT DOCUMENTS

| | | | |
|---|---|---|---|
| 5,280,530 A * | 1/1994 | Trew et al. ............... | 382/103 |
| 5,748,904 A | 5/1998 | Huang et al. | |
| 5,793,371 A | 8/1998 | Deering | |
| 5,835,244 A | 11/1998 | Bestmann | |
| 5,848,410 A | 12/1998 | Walls et al. | |
| 5,926,647 A | 7/1999 | Adams et al. | |
| 5,926,812 A | 7/1999 | Hilsenrath et al. | |
| 6,094,649 A | 7/2000 | Bowen et al. | |
| 6,353,840 B2 | 3/2002 | Saito et al. | |
| 6,397,213 B1 | 5/2002 | Cullen et al. | |
| 6,421,675 B1 | 7/2002 | Ryan et al. | |
| 6,424,587 B1 * | 7/2002 | Hosoda ................. | 365/230.03 |
| 6,530,944 B2 * | 3/2003 | West et al. .............. | 607/88 |
| 6,564,214 B1 | 5/2003 | Bhide | |
| 6,654,758 B1 | 11/2003 | Teague | |
| 6,658,408 B2 | 12/2003 | Yano et al. | |
| 6,690,828 B2 | 2/2004 | Meyers | |
| 6,738,653 B1 * | 5/2004 | Sfez et al. ............. | 600/322 |
| 6,772,150 B1 | 8/2004 | Whitman et al. | |
| 6,873,806 B2 | 3/2005 | Kobayashi et al. | |
| 6,963,663 B1 * | 11/2005 | Yoshida .............. | 382/167 |
| 6,975,418 B1 | 12/2005 | Ohta et al. | |
| 6,982,811 B2 | 1/2006 | Sato | |
| 7,027,054 B1 * | 4/2006 | Cheiky et al. .......... | 345/473 |
| 7,110,996 B2 | 9/2006 | Kawamura | |
| 7,140,535 B2 | 11/2006 | Sussman | |
| 7,174,332 B2 | 2/2007 | Baxter et al. | |
| 7,181,480 B1 * | 2/2007 | Nikiel et al. ............ | 1/1 |
| 7,209,653 B2 | 4/2007 | Umeda | |
| 7,231,243 B2 * | 6/2007 | Tearney et al. .......... | 600/407 |
| 7,233,684 B2 * | 6/2007 | Fedorovskaya et al. ..... | 382/118 |
| 7,266,544 B1 | 9/2007 | Dodge et al. | |

(Continued)

OTHER PUBLICATIONS

Office Action in U.S. Appl. No. 13/407,139 issued Apr. 30, 2012, 5 pages.

*Primary Examiner* — Yosef Kassa

(57) ABSTRACT

Digital image data including discrete photographic images of a variety of different subjects, times, and so forth, are collected and analyzed to identify specific features in the photographs. In an embodiment of the invention, distinctive markers are distributed to aid in the identification of particular subject matter. Facial recognition may also be employed. The digital image data is maintained in a database and quarried in response to search requests. The search requests include criteria specifying any feature category or other identifying information, such as date, time, and location that each photograph was taken, associated with each photograph. Candidate images are provided for review by requesters, who may select desired images for purchase or downloading.

20 Claims, 2 Drawing Sheets

U.S. PATENT DOCUMENTS

| | | | |
|---|---|---|---|
| 7,266,554 B2 | 9/2007 | Kayahara et al. | |
| 7,287,253 B2 | 10/2007 | Yamamura et al. | |
| 7,302,057 B2 | 11/2007 | Rotholtz et al. | |
| 7,333,963 B2 | 2/2008 | Widrow et al. | |
| 7,359,535 B2 | 4/2008 | Salla et al. | |
| 7,379,627 B2 | 5/2008 | Li et al. | |
| 7,382,903 B2 * | 6/2008 | Ray | 382/118 |
| 7,388,693 B2 | 6/2008 | Ahmed et al. | |
| 7,418,116 B2 * | 8/2008 | Fedorovskaya et al. | 382/118 |
| 7,440,594 B2 * | 10/2008 | Takenaka | 382/118 |
| 7,555,148 B1 * | 6/2009 | Steinberg et al. | 382/118 |
| 7,562,299 B2 | 7/2009 | Millar et al. | |
| 7,596,247 B2 | 9/2009 | Ioffe | |
| 7,609,864 B2 | 10/2009 | Nagasaka et al. | |
| 7,639,898 B1 | 12/2009 | Chan | |
| 7,660,445 B2 * | 2/2010 | Ray | 382/118 |
| 7,706,633 B2 | 4/2010 | Chefd'hotel et al. | |
| 7,711,145 B2 * | 5/2010 | Gallagher | 382/103 |
| 7,715,659 B2 | 5/2010 | Zhao et al. | |
| 7,843,495 B2 * | 11/2010 | Aas et al. | 348/231.3 |
| 7,881,506 B2 | 2/2011 | Nagasaka et al. | |
| 7,941,197 B2 | 5/2011 | Jain et al. | |
| 8,065,611 B1 | 11/2011 | Chan et al. | |

* cited by examiner

METHOD AND APPARATUS FOR PHOTOGRAPH FINDING

CROSS-REFERENCE TO RELATED APPLICATIONS

This application is a continuation of U.S. application Ser. No. 12/874,929, filed Sep. 2, 2010 which is a continuation of U.S. application Ser. No. 12/325,589 filed Dec. 1, 2008, Now Pat. No. 7,844,141, which is a continuation of U.S. application Ser. No. 11/056,699 filed Feb. 10, 2005, now Pat. No. 7,460,737, which claims priority pursuant to 35 U.S.C. § 119(e) to U.S. Provisional Application No. 60/544,570, filed Feb. 12, 2004, which applications are specifically incorporated herein, in their entirety, by reference.

BACKGROUND OF THE INVENTION

Field of the Invention

Photography has transformed how people conceive of the world. Photographs allow people to see all sorts of things that are actually many miles away and/or years preceding. Photography lets people capture moments in time and preserve them for years to come.

Often people at a public place notice that a stranger has taken a photograph of which they would love to have a copy, Alternatively, after going somewhere, a person may bemoan the fact that he did not have a photograph of the event (in the present context, photograph also includes video, audio, or other representation).

A need exists, therefore, to provide a method and apparatus for identifying and connecting people with photographs they want. In addition, there is a need to provide a method and apparatus for characterizing errant photographs stored on computer databases that makes use of a variety of attributes to reliably characterize photographs in such a way as to reduce the amount of manual review necessary to identify and connect people with the photographs they want.

SUMMARY OF THE INVENTION

The present invention provides a method and apparatus that matches people with photographs in which they accidentally (or purposely) appear or with photographs of events they have attended.

Specifically, in one embodiment, a web site is created with a database backend. The database is seeded with information provided by (1) the photographer; (2) recovering metadata from the photograph; (3) reading devices such as a Global Positioning System (GPS) device; (4) referencing the account data of the photographer (i.e., account number, photographer's zip code or area code, etc.); (5) analyzing the photograph (i.e., computer recognizes eye color, optical character recognizes any text found in the photograph, recognizes the number of persons, the gender of persons, the hair color, the time of day by optical character recognizing any clocks in the photograph or analyzing the lighting conditions, the weather, etc.); (6) photograph quality information; and/or (7) any other information.

A user looking for a photograph would visit the web site and search for certain criteria. The user is then provided with a gallery of thumbnails that match the criteria. When the user identifies a photograph he wants to own, he can then download the full quality version, or order print(s). In a preferred implementation, the user is charged some amount of money that is split between the site owner and the photographer. Alternatively, the user may be charged in some other way, such as by viewing advertisements or by exchanging credits for downloads or by some other payment or a combination thereof.

A more complete understanding of the present invention will be afforded to those skilled in the art, as well as a realization of additional advantages and objects thereof, by a consideration of the following detailed description of the preferred embodiments.

DETAILED DESCRIPTION OF THE PREFERRED EMBODIMENTS

The present invention provides a method and apparatus that matches people with photographs in which they accidentally (or purposely) appear or with photographs of events they have attended.

Figure 1:
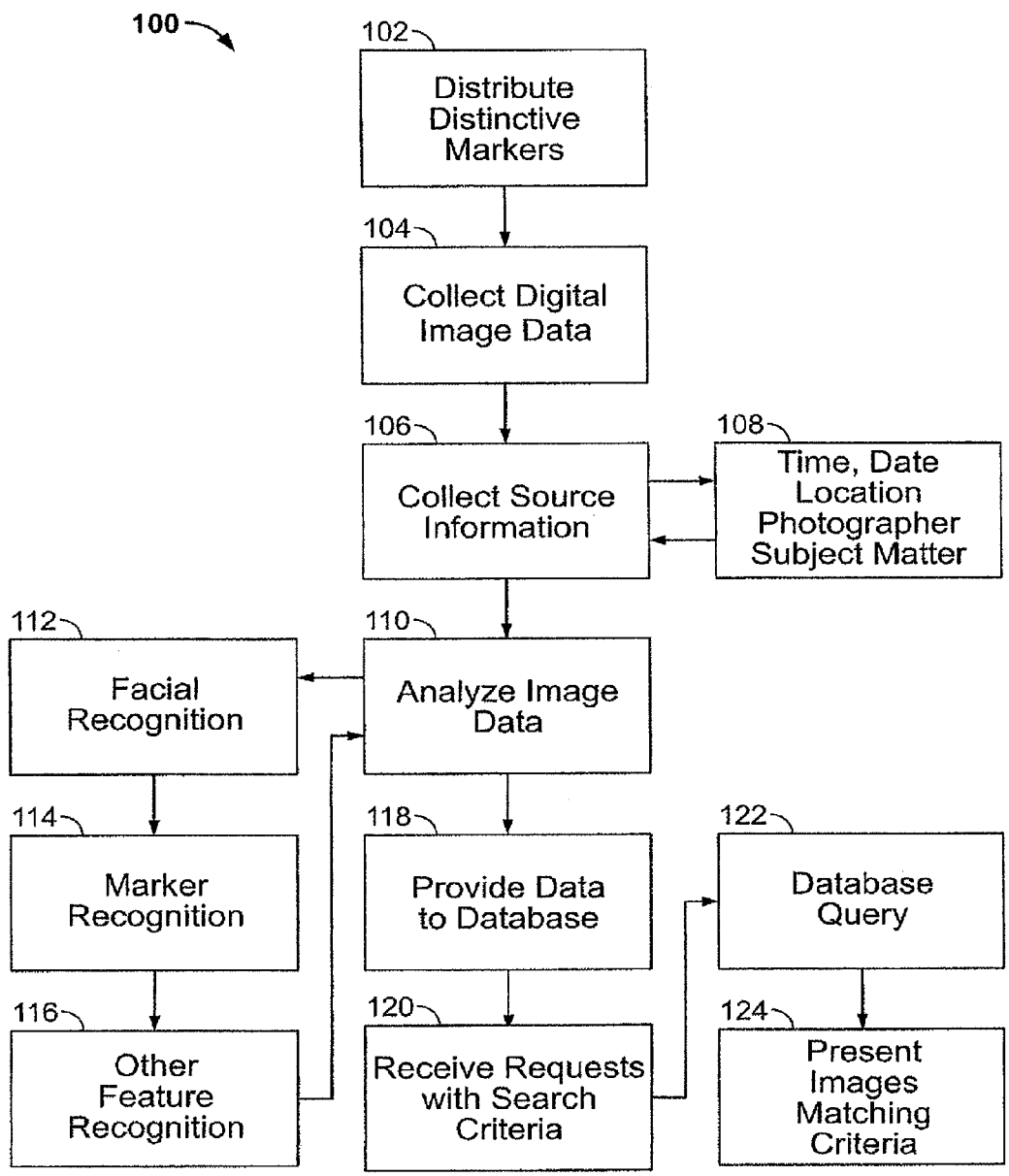
FIG. 1 is a flow diagram showing exemplary steps of a method according to the invention.

FIG. 1 illustrates exemplary steps of a method 100 according to the invention. At optional step 102, distinctive markers may be distributed to persons desiring to contribute photographic images to a database. The markers may comprise, for example, distinctive bins, badges, or stickers for placing on objects to be photographed. The markers should be designed so as to be easily recognized using automatic recognition algorithms, but should not be too conspicuous.

At step 104, image data is collected from a variety of sources. It may be desirable to accept material from as many sources as possible, to increase the number of images available for browsing. Optionally, images may be accepted from qualified sources only.

At step 104, source information regarding each photograph is collected. For example, at step 108, the image provider may be asked for information, such as the time and date of the photograph, the subject matter, location, photographer, etc. Image metadata may also be read to obtain such information. Other ways of associating images to identifying information may include, for example, reading devices such as a Global Positioning System (GPS) device attached to a camera or other image capture device, or by referencing account data of the image contributor (e.g., account number, photographer's zip code or area code, etc.).

At step 110, image data is analyzed to identify any characteristics that may be of interest to users. Such characteristics may include, for example, eye color, words and sentences, a number or gender of persons, the hair color, time of day, lighting conditions, and so forth. For further example, at step 112, a facial recognition program as known in the art may be used to analyze any faces appearing in the photos at a sufficiently high resolution. At step 114, the images may be analyzed for the presence of any known markers. And at step 116, other features and qualities of the image may be classified, for example, whether it is taken indoors or outdoors, whether it contains people, dogs, cats, or other animals, whether it contains automobiles, airplanes, or other objects, and so forth. At step 118, selected feature information and other source information is associated with each image and provided to any suitable relational database.

At step 120, requests specifying search criteria for photographic images are received. For example, a user looking for a photograph may visit a web site hosted by the system and fill out a search form specifying search criteria of interest. The criteria may include specific subject matter, times, dates, and locations. For example, "Disneyland AND Matterhorn AND blue eye AND child AND Jan. 1, 2004 AND morning" would search for a photograph or photographs taken at Disneyland's Matterhorn with a child who has blue eyes on the morning of Jan. 1, 2004.

At step 122, the image database is queried as known in the art, to identify images that at least partially match the search criteria. Such images may be presented, at step 124, to the user. For example, the user may be provided with a gallery of "thumbnail" (reduced-size) images generated from images that match the criteria. When the user identifies a photograph he wants to own, he can then download the full quality version, or order print(s). In a preferred implementation, the user is charged some amount of money that is split between the site owner and the photographer. Alternatively, the user may be charged in some other ways such as by viewing advertisements or by exchanging credits for downloads or by some other payment or a combination thereof. The price can be on a sliding scale depending on the quality of the photograph that the user downloads or the size or quality of the print. For example, a photograph may cost $1.00 for 1024×768 resolution or $2.00 for 1600×1200 resolution. Similarly, a print may cost $1.00 for 3×5 or $5 for 8×10. For downloads, an "upgrade" may be possible by charging the difference between the resolutions. An automated process may be used to reduce the number of pixels for purposes of having a lower quality version to sell.

In addition, a surcharge may be applied (even if no surcharge is required) for various enhancements to the photograph, such as "upconverting" to a higher resolution, eliminating red-eye, enhancing shadow, color, or brightness, etc.

Moreover, when a photographer takes photographs, he can be provided with printed cards bearing a Uniform Resource Locator (URL) and a unique code in order that the user would be able to enter into the web site to find the photograph or the series of photographs then being taken. The photographer can also distribute cards (the printed cards bearing the URL and the unique code or any other cards known to those skilled in the art) to people whom he photographs, whether intentionally or inadvertently. The photographer can further advertise the same (e.g., the URL and the unique code) via a mark on his camera, a T-shirt, or other means.

Fixed-place cameras can also serve this function (e.g., the of photographer). For example, a camera set up at an intersection in Hollywood might take and upload one photograph every 10 seconds.

Photographers can also be given accounts and be allowed to upload photographs to the site. The database is populated during this process, although additional database information can be added later by web site users. In addition, the number of times the photograph has been purchased and/or viewed can be a part of the database.

In one embodiment, the method and apparatus of the present invention should be capable of face recognition. It should assign values to various factors (i.e., ratio of distance between pupils to distance to tip of nose, etc.). It would add this information to the database for uploaded photographs. A user can then upload a photograph of the target person and the system would then generate the same data from that photograph and use it to limit the possible search targets.

Figure 2:
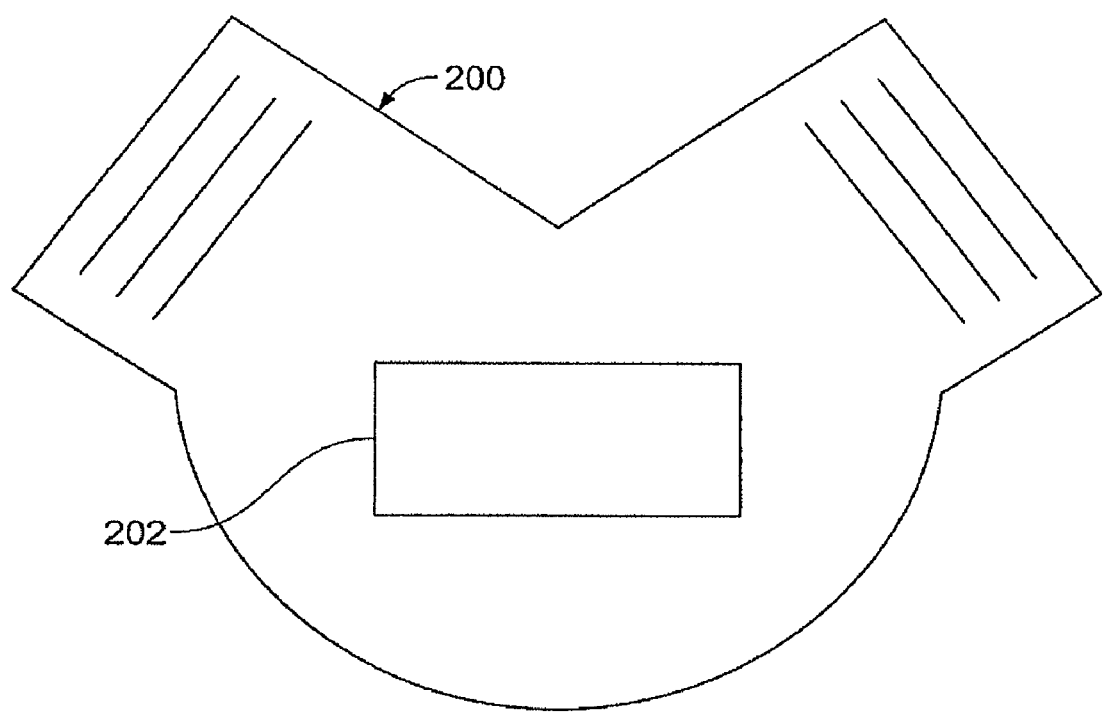
FIG. 2 is a diagram showing an exemplary distinctive marker for photographic data.

A provider of the present method and apparatus or a photographer can also hand out pins, clothing, or other materials that are marked in a way that allows a computer to later recognize them in a photograph. FIG. 2 shows an exemplary distinctive marker 200 having an optical code 202, such as a bar code. The marker may have a color combination, distinctive shape, lettering, bar code, or other optical pattern, or some combination of the foregoing, that is unique to the marker. The marker may be computer generated, for example, and produced using an end-user's laser or ink-jet printer. The marker may be associated with specific information, for example, a particular user account, photographer, subject matter type, person, event, or location. Users can later search for photographs containing an image of the marker.

Numerous distribution mechanisms exist whereby photographs may be distributed from a source over a wide area network, such as the Internet. In some cases, the photographs are distributed using a centralized server system (such as Napster 2.0, eBay, or from a web site). In other cases, the photographs are distributed using a decentralized system (such as Gnutella). In a preferred implementation, the photographs are distributed to a person using the centralized server system or using a central hub.

Embodiments of the present invention operate in accordance with at least one web-hosting mechanism and a plurality of user mechanisms communicating over a wide area network, such as the Internet. Specifically, a web-hosting mechanism includes a database, an interface application and a server, wherein the server is adapted to communicate with a plurality of user mechanisms over a wide area network. It should be appreciated that the mechanisms described can include, but are not limited to, personal computers, mainframe computers, personal digital assistances, wireless communication devices and all other physical and wireless connected network devices generally known to those skilled in the art. It should further be understood that the database depicted can include, but is not limited, to RAM, cache memory, flash memory, magnetic disks, optical disks, removable disks, SCSI disks, IDE hard drives, tape drives, and all other types of data storage devices (and combinations thereof, such as RAID devices) generally known to those skilled in the art. In addition, the mechanisms described above are for purposes of example only and the invention is not limited thereby.

Having thus described several embodiments for photograph finding, it should be apparent to those skilled in the art that certain advantages of the system have been achieved. It should also be appreciated that various modifications, adaptations, and alternative embodiments thereof may be made within the scope and spirit of the present invention. For example, in the context of the present invention a photograph can include video, audio, and/or other representation of how people conceive of the world. The invention is defined by the following claims.

What is claimed is:

1. A method, comprising:
    a computer system receiving a plurality of images selected by one or more users of a web site;
    the computer system analyzing the plurality of images to identify features present in ones of the plurality of images;
    the computer system receiving a search request to search a database including the plurality of images, wherein the search request specifies one or more features as search criteria; and
    the computer system providing a response to the search request via the web site, wherein the response identifies one or more of the plurality of images having one or more of the specified features.

2. The method of claim 1, wherein the analyzing includes performing a facial recognition analysis to identify facial features of faces present in ones of the plurality of images.

3. The method of claim 2, wherein the facial features include eye color.

4. The method of claim 1, wherein the analyzing includes performing an optical character recognition analysis to identify text present in ones of the plurality of images.

5. The method of claim 1, wherein the analyzing includes analyzing lighting conditions of ones of the plurality of images.

6. The method of claim 1, wherein the analyzing includes identifying weather conditions present in ones of the plurality of images.

7. The method of claim 1, wherein one of the plurality of images includes a clock, and wherein the analyzing includes determining a time value specified by the clock.

8. A computing system, comprising:
   memory storing instructions executable by the computing system to:
   receive, via a web site, a search request to search a database including a plurality of images and metadata corresponding to features of the plurality of images, wherein the search request specifies one or more features as search criteria; and
   provide, via the web site and in response to receiving the search request, a response that identifies one or more of the plurality of images having one or more of the specified features.

9. The computing system of claim 8, wherein the metadata includes data about facial features of faces present in ones of the plurality of images, and wherein the instructions are executable to:
   receive a search request specifying one or more facial features; and
   provide a response that identifies one or more of the plurality of images indicated by the metadata as having one or more of the specified facial features.

10. The computing system of claim 8, wherein the metadata includes global position system (GPS) data for ones of the plurality of images, and wherein the instructions are executable to:
    receive a search request specifying a location; and
    provide a response that identifies one or more of the plurality of images indicated by the metadata as having GPS data associated with the specified location.

11. The computing system of claim 8, wherein the response is a web page that includes instances of the one or more images.

12. The computing system of claim 8, wherein the metadata includes marker data indicative of markers present in ones of the plurality of images, and wherein the instructions are executable to:
    receive a search request specifying a marker; and
    provide a response that identifies one or more of the plurality of images indicated by the metadata as having the specified marker.

13. The method of claim 12, wherein the instructions are further executable to:
    receive a search request containing an image having one or more features; and
    provide a response that identifies one or more of the plurality of images indicated by the metadata as having one or more of the features of the image.

14. The method of claim 8, wherein the metadata includes author data identifying authors of ones of the plurality of images, and wherein the instructions are executable to:
    receive a search request specifying an author; and
    provide a response that identifies one or more of the plurality of images indicated by the metadata as having the specified author.

15. A method, comprising:
    a computer system maintaining a database of images and metadata associated with the images, wherein the metadata for respective ones of the images include facial features for faces identified in the respective ones of the images;
    the computer system receiving, via a web site, a request to search the database, wherein the request specifies one or more facial features as search criteria; and
    the computer system identifying, via the web site, one or more images in the database having facial features similar to the specified one or more facial features.

16. The method of claim 15, further comprising:
    the computer system analyzing ones of the images to generate corresponding metadata for the database.

17. The method of claim 15, wherein the request further specifies a number of people, and wherein the identifying includes identifying one or more images including the specified number of people.

18. The method of claim 15, wherein the request further specifies one or more items, and wherein the indentifying includes identifying one or more images including one or more of the specified items.

19. The method of claim 15, wherein the identifying includes providing a web page that includes thumbnails of the one or more images.

20. The method of claim 15, further comprising:
    the computer system receiving a request to purchase one or more of the identified images; and
    the computer system facilitating the purchase.

* * * * *

UNITED STATES PATENT AND TRADEMARK OFFICE
CERTIFICATE OF CORRECTION

PATENT NO. : 8,385,691 B2  
APPLICATION NO. : 13/090026  
DATED : February 26, 2013  
INVENTOR(S) : Shuster It is certified that error appears in the above-identified patent and that said Letters Patent is hereby corrected as shown below:

In the Specification

In Column 3, Lines 45-46, delete "the of photographer)." and insert -- of the photographer). --, therefor.

In the Claims

In Column 5, Line 12, in Claim 7, delete "one" and insert -- ones --, therefor.

In Column 6, Line 5, in Claim 13, delete "method" and insert -- computing system --, therefor.

In Column 6, Line 12, in Claim 14, delete "method" and insert -- computing system --, therefor.

In Column 6, Line 39, in Claim 18, delete "indentifying" and insert -- identifying --, therefor.

Signed and Sealed this  
Twenty-fifth Day of February, 2014

Michelle K. Lee  
*Deputy Director of the United States Patent and Trademark Office*